Patented Mar. 30, 1954

2,673,848

UNITED STATES PATENT OFFICE 2,673,848

3-ALKENYLXANTHINES AND THEIR LOWER 1-ALKYL DERIVATIVES

Viktor Papesch, Morton Grove, Ill., assignor to G. D. Searle & Co., Chicago, Ill., a corporation of Illinois No Drawing. Application December 29, 1951, Serial No. 264,249

10 Claims. (Cl. 260—256)

The present invention relates to a new group of organic heterocyclic compounds and, more particularly, to 3-alkenylxanthines and their 1-alkyl derivatives. The compounds which constitute this invention can be represented by the structural formula

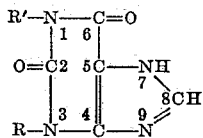

wherein R is a lower alkenyl radical and R' is a lower alkyl radical.

In the foregoing structural formula the radical R represents unsaturated aliphatic hydrocarbon radicals such as vinyl, propenyl, butenyl, pentenyl, hexenyl, pentadienyl, as well as lower alkyl-substituted derivatives thereof such as methylallyl, ethylallyl, methylcrotyl, methylpentenyl and the like. The other radical R can be a lower alkyl radical such as methyl, ethyl, straight or branch-chained propyl, butyl, amyl, and hexyl.

It has been found that highly potent diuretic and cardiovascular agents can be obtained in the series of the 1,3-dialkylxanthines, especially where the two alkyl groups are ethyl radicals. However, these compounds have been found impractical for clinical use because of their strong emetic action. This emetic action is also a serious drawback of the older methylated xanthines such as theobromine and theophylline, although the effect is not as pronounced as in the case of the higher alkylated derivatives. It has now been found that by substituting a 3-allyl radical on the xanthine nucleus, potent diuretic and cardiovascular agents are obtained which neither present this emetic effect nor show the undesirably great central stimulant properties of some of the previously known alkylated xanthines, especially the 7-alkylxanthines.

It is the object of this invention to provide valuable therapeutic agents of low toxicity. These compounds can also be used as intermediates in organic synthesis, especially for the preparation of further substituted xanthines such as those containing substituents in the 7 and 8 position.

The following examples illustrate in detail certain of the compounds which comprise this invention and methods for producing them. The invention is not to be construed as limited thereby in spirit and in scope. It will be apparent to chemists skilled in the art that many modifications in materials and methods can be made without departing from our invention. In this application the temperatures are given uncorrected in degrees centigrade (° C.), the quantities of materials in parts by weight, and pressure during vacuum distillation in millimeters (mm.) of mercury.

The present application is a continuation-in-part of the copending applications of applicant and Elmer F. Schroeder, Serial No. 170,256, filed June 24, 1950, now Patent No. 2,602,795, and Serial No. 198,028, filed November 28, 1950, now abandoned.

*Example 1*

85 parts of mono-allylurea are dissolved in 105 parts of acetic anhydride, 85 parts of cyanoacetic acid are added gradually and the mixture is maintained at 60° C. for 2.5 hours. The mixture is distilled at 20 mm. until a syrup remains. 50 parts of water are added to this syrup and distillation is resumed. The resulting syrup is dissolved in 96% ethanol at 60° C., stirred with charcoal and filtered. One to one and one half volumes of ether are added to the filtrate at 40° C. Upon cooling the N-cyanoacetyl-N'-allylurea precipitates. It is collected on a filter and washed with ether. The white crystals melt at about 142–143° C. The N-cyanoacetyl-N'-allylurea is dissolved by warming with 10% sodium hydroxide. Sufficient 70% sodium hydroxide is added to raise the pH to 10. The solution is maintained at 60° C. for five minutes. After cooling the crystals are collected on a filter and recrystallized from water. 1-allyl-6-amino-1,2,3,4-tetrahydro-2,4-pyrimidinedione is obtained in the form of white crystals melting at 270–272° C.

90 parts of these crystals in 300 parts of water and 400 parts of ethanol are nitrosated by addition of 36 parts of sodium nitrite at 70° C. and subsequent treatment with 42 parts of glacial acetic acid with vigorous stirring. The mixture is heated at 80° C. for 5 minutes and then cooled. The purple precipitate of the 1-allyl-5-nitroso - 6 - amino - 1,2,3,4 - tetrahydro - 2,4,-pyrimidinedione is collected on a filter, washed with water, and recrystallized from 50% ethanol. It melts at about 233° C. with decomposition.

Into 183 parts of a 28% ammonium hydroxide solution and 350 parts of ice is passed hydrogen sulfide until 51 parts are taken up. The solution is then heated to boiling and treated by portionwise addition with 120 parts of the above nitroso compound. Boiling is continued until no more ammonium sulfide odor is noticeable. The solution of 1-allyl-5,6-diamino-1,2,3,4-tetrahydro-2,4-pyrimidinedione thus obtained is then boiled with 122 parts of formic acid until a precipitate forms. The mixture is treated with a sufficient amount of 70% sodium hydroxide to raise the pH to 10 and boiled for 45 minutes. After cooling the solution is rendered slightly acid with concentrated hydrochloric acid and the precipitate is collected on a filter and recrystallized from water, using charcoal as a clarifying agent. The 3-allylxanthine thus obtained melts at about 301–303° C. and has the structural formula

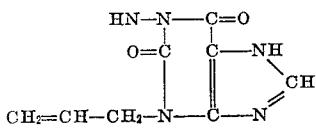

Example 2

100 parts of 1-allyl-6-amino-1,2,3,4-tetrahydro-2,4-pyrimidinedione are dissolved in a solution of 26 parts of sodium hydroxide in 250 parts of water. In the course of one-half hour, 108 parts of dimethyl sulfate are added dropwise to this solution at a temperature of 50–55° C. Heating and stirring are continued for an additional half hour, the alkaline reaction being maintained by occasional addition of small portions of 20% sodium hydroxide, about 150 parts in all being required. On cooling, a crystalline product slowly separates, which is filtered off, washed with water and recrystallized from about 50 parts of water containing a small amount of sodium hydroxide. The air-dried product thus obtained is the monohydrate of 1-allyl-3-methyl-6-amino-1,2,3,4-tetrahydro-2,4-pyrimidinedione, melting with partial dehydration at about 74–75° C. The anhydrous 1-allyl-3-methyl-6-amino-1,2,3,4-tetrahydro-2,4-pyrimidinedione is obtained by heating the hydrate at 80° C. for 48 hours and recrystallizing from ethyl acetate. The crystals melt at about 143–144° C. This same product can also be obtained by methylating 1-allyl-6-amino-1,2,3,4-tetrahydro-2,4-pyrimidinedione with methyl iodide according to the procedure of Example 6.

290 parts of 1-allyl-3-methyl-6-amino-1,2,3,4-tetrahydro-2,4-pyrimidinedione in 600 parts of water are treated at 80° C. with 105 parts of sodium nitrite and then with 126 parts of glacial acetic acid, the temperature rising to 100° C. The temperature is maintained at 100° C. for a few minutes after which the mixture is cooled and the 5-nitroso derivative is collected on a filter and washed with water.

Into 515 parts of 28% ammonium hydroxide and 1100 parts of ice, a stream of hydrogen sulfide is passed until the uptake is 136 parts. The solution is then heated to boiling and 300 parts of the 1-allyl-3-methyl-5-nitroso-6-amino-1,2,3,4-tetrahydro-2,4-pyrimidinedione are added in small portions. The mixture is boiled until the odor of ammonium sulfide is no longer noticeable. The solution of the 1-allyl-3-methyl-5,6-diamino-1,2,3,4-tetrahydro-2,4-pyrimidinedione thus obtained is heated at reflux temperature with 400 parts of formic acid for 3 hours. After some time there is formation of a loose and granular precipitation and eventually almost the entire mixture becomes solid. 200 parts of the resulting formyl compound are suspended in 2000 parts of water, treated with a sufficient amount of 70% sodium hydroxide to raise the pH to 10, boiled with charcoal for 15 minutes, and then filtered. The filtrate is acidified while hot and cooled. The 1-methyl-3-allylxanthine thus obtained melts at about 207–208° C. It has the structural formula

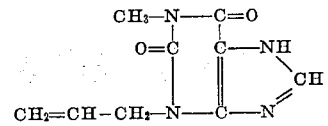

Example 3

A solution of 10 parts of 1-methyl-3-allylxanthine is dissolved in 100 parts of water, treated with a sufficient amount of 10% sodium hydroxide to raise the pH to 10 and then shaken with 5.4 parts of dimethyl sulfate. The solution is realkalinized by addition of 10% sodium hydroxide, shaken with an additional quantity of 4 parts of dimethyl sulfate, neutralized with 10% sodium hydroxide, stirred with charcoal and filtered. The filtrate is cooled and the precipitated long needles are collected on a filter and washed with water. The 3-allyl-paraxanthine thus obtained melts at about 115–117° C.

Example 4

To a solution of 38.4 parts of 3-allylxanthine in 44 parts of a 10% solution of sodium hydroxide, there are added 13.3 parts of dimethyl sulfate. The mixture is stirred and warmed until complete solution has occurred. Then 88 additional parts of 10% sodium hydroxide and 15 parts of dimethyl sulfate are added. The pH is then lowered to 4 by treatment with hydrochloric acid. After chilling the precipitate is collected on a filter and recrystallized twice from water, using charcoal as a clarifying agent. The 3-allyl-7-methylxanthine melts at about 240° C.

Example 5

300 parts of N-ethyl-N'-allylurea are dissolved in 650 parts of acetic anhydride and 630 parts of glacial acetic acid. Then 190 parts of cyanoacetic acid are added and the mixture is maintained at 65° C. for 2 hours. Most of the solvent is then distilled off at 20 mm. pressure and 60° C. 100 parts of water are added to the syrup and the distillation is resumed. The remaining syrup consists principally of N-cyanoacetyl-N-ethyl-N'-allylurea but also contains a significant amount of N-cyanoacetyl-N-allyl-N'-ethylurea. 50 parts of this syrup are dissolved in 50 parts of 10% sodium hydroxide and the pH is adjusted to 10 by addition of 70% sodium hydroxide. The mixture is maintained at 60° C. for 5 minutes. On cooling crystals separate which are collected on a filter. These crystals consist principally of the 1-allyl-3-ethyl-1,2,3,4-tetrahydro-2,4-pyrimidinedione but contain a significant amount of 1-ethyl-3-allyl-1,2,3,4-tetrahydro-2,4-pyrimidinedione. These crystals, which contain about 80% 1-allyl-3-ethyl-1,2,3,4-tetrahydro-2,4-pyrimidinedione and 20% 1-ethyl-3-allyl-1,2,3,4-tetrahydro-2,4-pyrimidinedione, melt after dehydration at about 132–133° C.

A solution of 150 parts of this compound in 340 parts of water is treated with 56 parts of sodium nitrite and then with 65 parts of glacial acetic acid while the temperature is maintained at 75° C. with vigorous stirring. After cooling the 5-nitroso derivative is collected on a filter and washed twice with water.

Hydrogen sulfide is passed into 298 parts of 28% ammonium hydroxide and 650 parts of ice until 73 parts are taken up. The solution is then heated almost to boiling temperature and treated by the portion-wise addition of 164 parts of 1-allyl - 3 - ethyl - 5 - nitroso - 6 - amino - 1,2,3,4-tetrahydro - 2,4 - pyrimidinedione. After boiling until the ammonium sulfide odor disappears, the solution of the 5,6-diamino compound is heated at 70° C. for 30 minutes with 80 parts of formic acid. The 5-formylamino compound is then treated with 70% sodium hydroxide solution. The green solution is maintained at a pH above 10, boiled for 15 minutes and filtered. The precipitate is collected on a filter, suspended in water, acidified by addition of hydrochloric acid, chilled and collected on a filter. Recrystallized from water, using charcoal as a clarifying agent, the white 1-ethyl-3-allylxanthine melts sharply at about 182–183° C. It has the structural formula

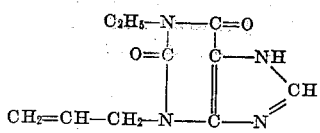

*Example 6*

50 parts of 1-allyl-6-amino-1,2,3,4-tetrahydro-2,4-pyrimidinedione are dissolved with warming in a solution of 13.2 parts of sodium hydroxide in 100 parts of water. After addition of 400 parts of ethanol and 61 parts of n-butyl iodide, the mixture is heated on the steam bath under a reflux condenser for two hours. The solution is treated briefly with decolorizing carbon, filtered, and the alcohol evaporated on the steam bath. The syrup thus obtained is covered with 500 parts of water containing about 10 parts of sodium hydroxide (to dissolve any unchanged 1-allyl-6-amino - 1,2,3,4 - tetrahydro - 2,4 - pyrimidinedione). On standing, the syrup slowly crystallizes. The crystals are filtered off, washed with water, and recrystallized from 30% aqueous ethanol. The monohydrate of 1-allyl-3-n-butyl-6 - amino - 1,2,3,4 - tetrahydro - 2,4 - pyrimidinedione separates out, and after air-drying, melts somewhat unsharply at 80–85° C.

The anhydrous compound obtained by heating the monohydrate for 24 hours at 80° C. and recrystallizing from ethyl acetate melts at about 95–97° C.

105 parts of this anhydrous compound in 1000 parts of water are nitrosated by the addition of 45 parts of sodium nitrite, boiling, and subsequent addition of 49 parts of glacial acetic acid with maintenance of temperature at 70° C. The mixture is cooled and the precipitate is collected on a filter and washed with water. 224 parts of the purple 1 - allyl - 3 - n - butyl - 5 - nitroso - 6-amino - 1,2,3,4 - tetrahydro - 2,4 - pyrimidinedione thus obtained are added to a hot solution of ammonium sulfide, prepared from 457 parts of 28% ammonium hydroxide, 1000 parts of ice and sufficient hydrogen sulfide to produce an uptake of 110 parts. Boiling is continued until no more odor of ammonium sulfide is noticeable. The solution of the 1-allyl-3-n-butyl-5,6-diamino-1,2,3,4-tetrahydro-2,4-pyrimidinedione is heated at reflux temperature with 500 parts of formic acid until complete solution has occurred after which the hot mixture is treated with charcoal, filtered and heated at reflux temperature for 3 hours. It is then treated with a sufficient amount of 70% sodium hydroxide to raise the pH to 10, boiled with charcoal for 15 minutes and filtered. The filtrate is acidified with hydrochloric acid and cooled to yield the 1-n-butyl-3-allylxanthine. Repeated recrystallization from water yields white crystals. The compound has the structural formula

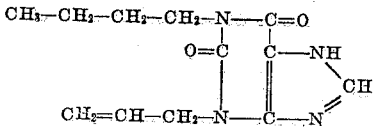

*Example 7*

194 parts of methallylurea are dissolved in 260 parts of acetic anhydride and treated with 170 parts of cyanoacetic acid. After heating and stirring at 70–75° C. for one half hour or until crystallization occurs, 800 parts of hot water are added. Upon cooling precipitation occurs. The N-cyanoacetyl-N'-methallylurea thus obtained melts at about 143–145° C. after another recrystallization from water. Cyclization is effected by dissolving in 400 parts of 5% sodium hydroxide solution and treating with a sufficient amount of 70% sodium hydroxide to raise the pH to about 10. After heating for one half hour at 75° C. the pH is lowered by addition of dilute hydrochloric acid to about 4, and the 1-methallyl-6-amino - 1,2,3,4 - tetrahydro - 2,4 - pyrimidinedione collected on a filter and recrystallized from dilute ethanol, using charcoal as a clarifying agent. The resulting pure crystals melt at about 266–268° C.

100 parts of 1-methallyl-6-amino-1,2,3,4-tetrahydro-2,4-pyrimidinedione in 380 parts of water and 300 parts of alcohol are treated at 80° C. with 36 parts of sodium nitrite and then with 435 parts of glacial acetic acid, the temperature rising to about 100° C. Heating at that temperature is continued for a few minutes after which the mixture is cooled and the magenta-colored 1-methallyl - 5 - nitroso - 6 - amino - 1,2,3,4 - tetrahydro-2,4-pyrimidinedione is collected on a filter and washer with water. It melts at about 230–232° C.

170 parts of 28% ammonium hydroxide and 400 parts of ice are treated with hydrogen sulfide until 45 parts are absorbed. The solution is then heated to below boiling and treated by cautious addition with 100 parts of the above 5-nitroso compound. Boiling is continued until no more odor of ammonium sulfide is noticeable. The remaining solution of the 5,6-diamino compound is refluxed with 135 parts of formic acid for 3 hours, chilled, and the precipitate collected on a filter. The 5-formyl derivative is suspended in 10 parts of its weight in water, treated with sufficient 70% sodium hydroxide to raise the pH to 10, boiled with charcoal, filtered hot, and solidified. Upon cooling and recrystallization from water the 1-methallylxanthine is obtained in colorless crystals. It has the structural formula

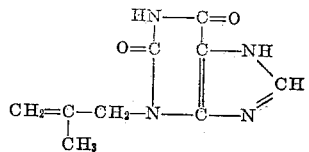

*Example 8*

To a solution of 50 parts of 1-methallyl-6-amino-1,2,3,4-tetrahydro-2,4-pyrimidinedione in 150 parts of a 12% sodium hydroxide solution, 50 parts of dimethyl sulfate are added dropwise at 55° C. After completion of this reaction the solution is neutralized by addition of concentrated sodium hydroxide and cooled. The 1-methallyl - 3 - methyl - 6 - amino - 1,2,3,4 - tetrahydro-2,4-pyrimidinedione is collected on a filter and recrystallized from a concentrated aqueous solution. It melts at about 145–146° C.

A solution of 300 parts of these crystals in 700 parts of water is treated at 80° C. with 112 parts of sodium nitrite and then with 130 parts of glacial acetic acid. After chilling the violet 5-nitroso derivative is collected on a filter and washed with water. Into a mixture of 600 parts of 28% ammonium hydroxide and 1300 parts of ice and hydrogen sulfide is passed until the uptake is 147 parts. To the warm solution, 330 parts of the 1-methallyl-3-methyl-5-nitroso-6-amino-1,2,3,4-tetra-hydro-2,4-pyrimidinedione are added portion-wise. Refluxing is continued until no more ammonium sulfide escapes after which the solution is heated at reflux temperature with 900 parts of formic acid for 2 hours and, after cooling, the formyl compound is collected on a filter, suspended in water and treated with a sufficient amount of 70% sodium hydroxide to raise the pH to 10. After boiling with charcoal, the mixture is filtered and the filtrate is acidified with hydrogen chloride. Recrystallization of the precipitate yields the clear crystals of 1-methyl-3-methallylxanthine which has the structural formula

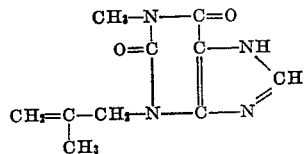

*Example 9*

To a solution of 70 parts of β-chloroethylisocyanate in 100 parts of benzene, a solution of 21 parts of methylamine in 100 parts of benzene is added dropwise with ice cooling and stirring until a sample no longer reveals acidic reaction. After 30 minutes of continued stirring the solution is evaporated and the residue is extracted with hot benzene. Evaporation of the solvent from the extract yields the N-(β-chloroethyl)-N'-methylurea. 81 parts of this urea derivative are dissolved in 400 parts of acetic anhydride and heated with 62 parts of cyanoacetic acid at 55° C. for 2 hours with stirring. The reaction mixture is concentrated at about 55° C. and 15 mm. pressure, treated with 200 parts of hot water and concentrated to a thick syrup. After addition of water and reconcentration, the syrup is treated with a sufficient amount of 10% sodium hydroxide to raise the pH to about 10 and warmed to 70° C. The resulting fluffy precipitate is separated by decantation of the supernatant and the precipitate is granulated by treatment with ethyl acetate.

83 parts of the 1-vinyl-3-methyl-6-amino-1,2,3,4-tetrahydro-2,4-pyrimidinedione in 300 parts of water and 300 parts of ethanol are nitrosated at 70° C. by treatment first with 36 parts of sodium nitrite and then with 42 parts of glacial acetic acid with vigorous stirring. After heating at 80° C. for 10 minutes, the reddish precipitate of the 1-vinyl-3-methyl-5-nitroso-6-amino-1,2,3,4-tetra-hydro-2,4-pyrimidinedione is collected on a filter. 85 parts of a 28% ammonium hydroxide solution and 200 parts of ice are treated with a stream of hydrogen sulfide until the uptake is 47.5 parts. The solution is warmed and then maintained near the reflux temperature by the portion-wise addition of 60 parts of the above nitroso compound. The excess of ammonium sulfide is removed by boiling and the remaining solution of 1-vinyl-3-methyl-5,6-diamino-1,2,3,4-tetrahydro-2,4-pyrimidinedione is suspended in 300 parts of water and boiled for 20 minutes with 65 parts of formic acid. The solution is filtered, treated with strong potassium hydroxide to raise the pH to 10 and boiled for 30 minutes. After cooling and acidification the 1-methyl-3-vinylxanthine is collected on a filter and recrystallized from water using charcoal as a clarifying agent. The clear white crystals have the structural formula

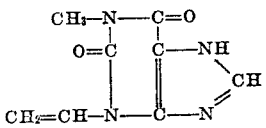

I claim:

1. The xanthines of the structural formula

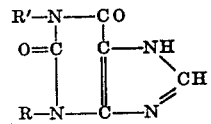

wherein R is a lower alkenyl radical and R' is a member of the class consisting of hydrogen and lower alkyl radicals.

2. The xanthines of the structural formula

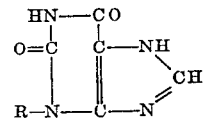

wherein R is a lower alkenyl radical.

3. 3-allylxanthine.
4. 3-methallylxanthine.
5. The xanthines of the structural formula

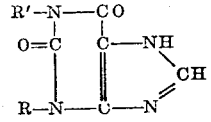

wherein R is a lower alkenyl radical and R' is a lower alkyl radical.

6. The 1-(lower)alkyl-3-allylxanthines.
7. 1-ethyl-3-allylxanthine.
8. 1-methyl-3-allylxanthine.
9. The 1-(lower)alkyl-3-methallylxanthines.
10. 1-ethyl-3-methallylxanthine.

VIKTOR PAPESCH.

References Cited in the file of this patent

UNITED STATES PATENTS

| Number | Name | Date |
| --- | --- | --- |
| 1,415,700 | Preiswerk | May 9, 1922 |